United States Patent [19]

Yamamoto et al.

[11] 4,251,839
[45] Feb. 17, 1981

[54] FLOATING HEAD DEVICE

[75] Inventors: Hiroshi Yamamoto; Shigehisa Suzuki; Osamu Tabata, all of Amagasaki, Japan

[73] Assignee: Mitsubishi Denki Kabushiki Kaisha, Tokyo, Japan

[21] Appl. No.: 10,681

[22] Filed: Feb. 9, 1979

[30] Foreign Application Priority Data

Feb. 21, 1978 [JP] Japan .................................. 53-19483

[51] Int. Cl.³ .............................................. G11B 5/60
[52] U.S. Cl. .................................................... 360/103
[58] Field of Search ............... 360/103, 102, 122, 129, 360/130.2; 308/DIG. 1

[56] References Cited

U.S. PATENT DOCUMENTS

| 3,657,710 | 4/1972 | Billawala | 360/103 |
| 3,678,482 | 7/1972 | Billawala | 360/103 |
| 3,823,416 | 7/1974 | Warner | 360/103 |
| 3,855,625 | 12/1974 | Garnier et al. | 360/103 |
| 4,081,846 | 3/1978 | Roscamp et al. | 360/103 |

FOREIGN PATENT DOCUMENTS 50-96209 7/1975 Japan .

Primary Examiner—Alfred H. Eddleman
Attorney, Agent, or Firm—Oblon, Fisher, Spivak, McClelland & Maier

[57] ABSTRACT

A floating head device has a floating surface for imparting a floating force for floating from a recording surface by air flow formed between the floating surface and the recording surface and a suction surface for imparting a sucking force in a relative movement of a head slider to the recording surface of a recording medium. The air inlet end of the suction surface has grooves and is disposed in down-stream of the air flow from the air inlet end of the floating surface.

11 Claims, 4 Drawing Figures

FLOATING HEAD DEVICE

BACKGROUND OF THE INVENTION

There has been a proposal of a suction type floating head device which imparts operating steps that a slider of the floating head is pushed on a rotary magnetic disc and a floating force is imparted such that crushing of the head is caused, with damage to both the head and surface to balance them, when the revolution of the rotary magnetic disc reaches to a predetermined revolution speed.

However, in the conventional suction type floating head device, the stability of the head slider is not easily maintained to cause a head crush and to cause a damage of both of the head and the rotary magnetic disc because various forces are applied to the head slider.

Referring to FIGS. 1 and 2, one embodiment of the conventional floating head device will be illustrated.

FIG. 1 is a schematic view of the embodiment and FIG. 2 is a sectional view and a pressure distribution diagram for illustrating a principle of the operation.

In FIG. 1, a head slider (1) is made of magnetic substance and the head slider (1) and a plurality of head parts with a plurality of gaps (3) are formed in one piece. The head slider (1) has a floating surface (4) for imparting a floating force in the operation, an inlet end taper (5) and a suction surface (6) for imparting a sucking force in the operation. The head slider (1) is held on a head holder (10) through a pressure spring (9) and is pushed on a recording surface (8) of a recording disc (7) by the pressure spring (9).

When the recording disc (7) is rotated relative to the head slider (1) in the arrow line direction at a relative speed U, a floating force F1 is imparted at the floating surface (4) of the head slider (1) so as to depart the head slider (1) from the recording surface (8) by air flow from the inlet end A through the outlet end B.

On the other hand, the suction surface (6) tapers away from the recording surface (8) in the direction from A to C; so that air flow caused by relative revolution between the recording disc (7) and head slider (1) creates a hydrodynamic negative pressure that is, a sucking force F2 is imparted so as to cause the head slider (1) to approach the recording surface (8). Thus, during the operation, the floating force F1 the sucking force F2 and pushing force F3 of the pressure spring (9) are applied to the head slider (1) whereby a small floating distance is maintained between the floating surface (4) and the recording surface (8) and an elevation angle $\theta 1$ between the floating surface (4) and the recording surface (8) and an elevation angle $\theta 2$ between the suction surfaces (6) and the recording surface (8) are maintained and three forces are automatically balanced.

In the graph of the pressure distribution corresponding to the sectional view of FIG. 2, the sucking force F2 has pressure distribution shown by a curve L to the air flow direction A-C on the suction surface (6). The center of the sucking force F2 is at a position D for a distance m from the air inlet end A to A-C. The distance m is usually given by the equation;

$$m = (0.2 \text{ to } 0.4) \times (\text{distance between } A \text{ and } B)$$

The moment produced at the center of the point O by the sucking force F2 is in a clockwise direction. In order to balance to the moment of the sucking force F2, the floating force F1 should be at the point E in the side of the air inlet end A from the point O of the head slider (1). Thus, the floating force F1, the sucking force F2 and the pushing force F3 of the pressure spring (9) are balanced at the side A of the air inlet end of the head slider (1). However, the three forces are respectively balanced at positions spaced from the point O, whereby various moments are formed and the stability of the head slider (1) is not easily maintained to cause the head crush sometimes.

SUMMARY OF THE INVENTION

It is an object of the present invention to provide a floating head device which does not have said disadvantages and has improved stability and reliability to attain high density recording.

The foregoing and other objects of the present invention have been attained by providing a floating head device which comprises a floating surface for imparting a floating force for floating from a recording surface by air flow formed between the floating surface and the recording surface and a suction surface for imparting a sucking force in a relative movement of a head slider to the recording surface of a recording medium and grooves formed at air inlet end of the suction surface so as to dispose the air inlet end of the suction surface in down-stream of the air inlet end of the air inlet end of the floating surface to the air flow direction along the recording surface.

DETAILED DESCRIPTION OF THE PREFERRED EMBODIMENTS

Figure 1:
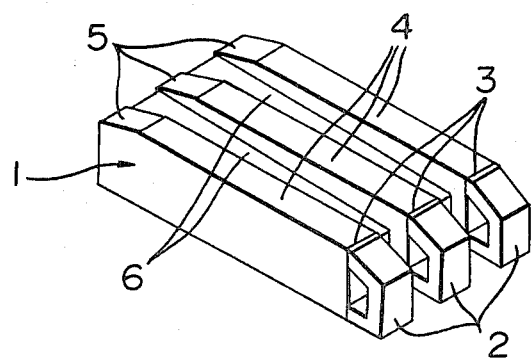
FIG. 1 is a schematic view of one embodiment of the conventional suction type floating head device having a plurality of floating surfaces and a plurality suction surfaces.

Referring to the drawings the embodiment of the present invention will be illustrated.

Figure 3:
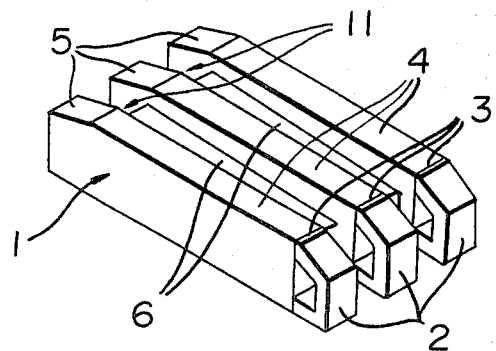
FIG. 3 is a schematic view of one embodiment of the present invention.
Figure 4:
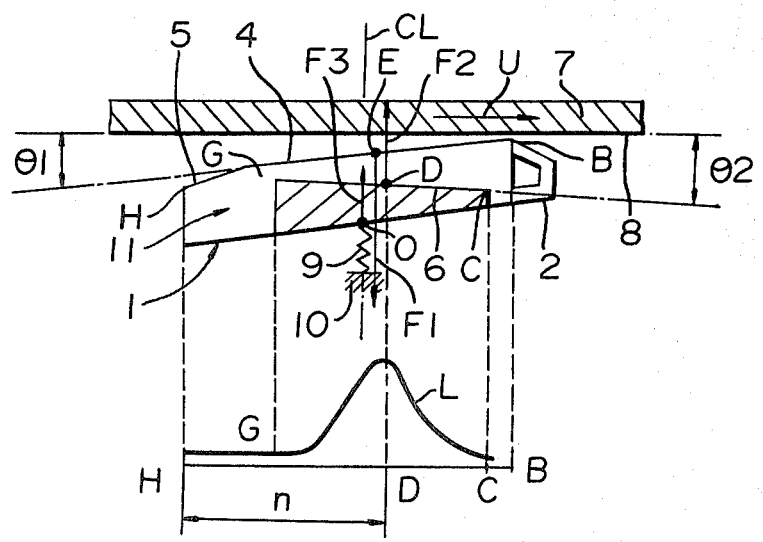
FIG. 4 is a sectional view and a pressure distribution of sucking force for illustrating the principle of the operation of the embodiment of FIG. 3.

FIG. 3 is a schematic view of one embodiment of the present invention and FIG. 4 is a sectional view and a pressure distribution of sucking force for illustrating the principle of the operation of the embodiment.

Figure 2:
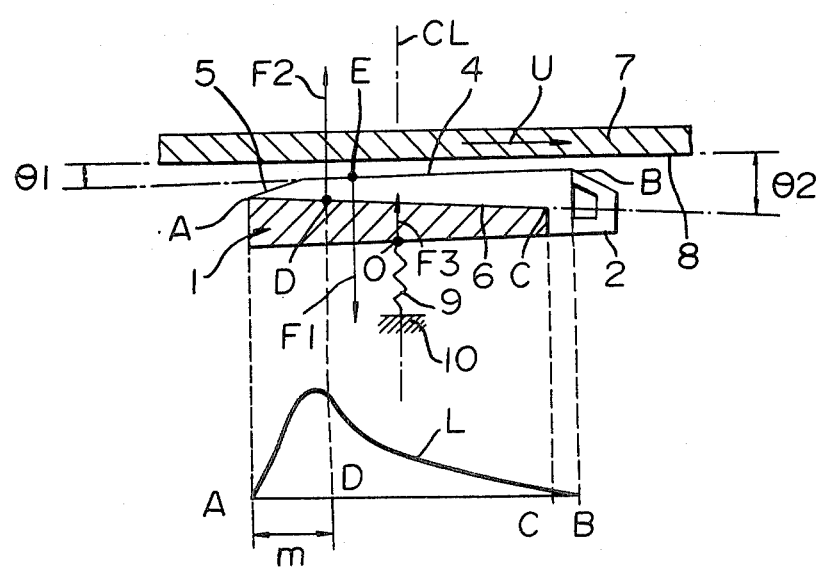
FIG. 2 is a sectional view and a pressure distribution of sucking force for illustrating the principle of the operation of the embodiment of FIG. 1.

The identical and corresponding parts of FIGS. 1 and 2 are designated by the same references in FIGS. 3 and 4.

In the embodiment of FIG. 3, grooves (11) are formed at the air inlet end of the suction surface (6) which is different from the conventional device shown in FIG. 1. Accordingly, the air inlet end G of the suction surface (6) is disposed in the down-stream from the air inlet H of the floating surface (4) to the air flow direction as shown in FIG. 4.

The head holder (1) is fixed on the head slider (10) and pushing on the recording surface (8) of the recording disc (7) by the pressure spring (9) which is actuated to the point O passing the center line of the head slide (1) as that of the conventional device.

In the structure, referring to FIG. 4 when the recording disc (7) is relatively rotated at a specific speed U shown by the arrow line, the sucking force F2 is imparted by the air flow in the space tapering away from the recording surface (8) toward the end between G-C of the suction surface (6). The pressure distribution of the sucking force F2 at H-G as the grooves (11) of the suction surface (6) and G-C of the suction surface (6) is given by the curve L. The center is near the point D which is departed for a distance n from the air flow end H of the head slider (1) and the distance n is given by the equation:

$$n = (0.4 \text{ to } 0.6) \times (\text{distance between } H \text{ and } B)$$

On the other hand, the floating force F1 is applied on the floating surface (4) to the direction departing the head slide (1) from the recording surface (8). The center of the floating force F1 is at the point E so as to balance to the sucking force F2. The point E is given near the point D for the center of the sucking force F2.

The pushing force F3 of the pressure spring (9) is applied near the point O passing through the center line CL of the head slider (1).

Thus, the grooves (11) are formed in the side of the air inlet end of the suction surface (6) whereby the three forces of the floating force F1, the sucking force F2 and the pushing force F3 are almost concentrated near the point O. Accordingly, the various moments imparted for the conventional head slider (1) shown in FIG. 2 are given whereby free pitching movement of the head slider (1) is allowed regardless of the three forces and the stability of the floating head is attained.

The elevation angle θ1 between the floating surface (4) and the recording surface (8) at the air inlet end is significantly greater than that of the conventional device and the stability of the head is improved to reduce remarkably a possibility of crushing of the head.

Moreover, the air flow end B further approaches to the recording surface (8), whereby the distance for floating can be small and high density recording can be attained.

The present invention can be applied for both of the fixed head type and the movable head type without any discrimination and can be also applied to not only the disc type device, but also to the disc device, a drum type memory device or a sheet type memory device.

What is claimed is:

1. A floating head device, comprising:
a head slider having a floating surface for imparting a floating force to the slider cause by air flow formed between the slider and a recording surface upon relative movement between the slider and recording surface;
at least one channel in the slider extending longitudinally thereof and defining a suction surface spaced from the recording surface a greater distance than the floating surface for imparting a sucking force between the slider and recording surface upon relative movement between the slider and recording surface; and
said slider having grooves formed therethrough at the inlet end of the suction surface, relative to the direction of air flow, thereby locating the effective inlet end of the suction surface downstream relative to the effective inlet end of the floating surface and producing resultant force moments concentrated near the center of the slider, improving that stability and reliability thereof.

2. A floating head device according to Claim 1, wherein: said floating surface and said recording surface form an elevation angle θ1 so as to reduce the gap between the floating surface and the recording surface in the air flow direction; and said floating surface and said suction surface form an elevation angle θ2 so as to broaden the gap between the suction and the recording surface in the air flow direction.

3. A floating head device, comprising:
a recorder medium having a recording surface;
a head holder at the recording surface side of the recording medium;
a pressure spring connected with the head holder;
a head slider connected with the spring and supported thereby so as to be urged toward the recording surface with a pushing force;
said head slider having a floating surface for imparting a floating force to the slider caused by air flow between the floating surface and recording surface upon relative movement therebetween;
at least one channel in the slider extending longitudinally thereof and defining a suction surface spaced from the recording surface a greater distance than the floating surface for imparting a sucking force between the slider and recording surface upon relative movement between the slider and recording surface; and
said slider having grooves formed therethrough at the inlet end of the suction surface, relative to the direction of air flow, thereby locating the effective inlet end of the suction surface downstream relative to the effective inlet end of the floating surface and producing resultant force moments concentrated near the center of the slider, improving the stability and reliability thereof.

4. A floating head device according to claim 3 or 2, wherein: the floating head device has a head part and an inlet end tapered part, and the inlet end tapered part forms a part of the floating force in the operation.

5. A floating head device according to claim 3 wherein the floating force F1, the sucking force F2 and the pushing force F3 are concentrated near the center of the head slider.

6. A floating head device according to Claims 1, 2, 3 or 5, wherein the air inlet end of the suction surface extends away from the floating surface and the recording surface.

7. A floating head device, according to Claims 1, 2, 3 or 5, wherein the slider is a fixed head type device.

8. A floating head device according to Claims 1, 2, 3 or 5, wherein the slider is a movable head type device.

9. A floating head device according to Claims 1, 2, 3, or 5, wherein the recording medium is one of a disc, a drum and a sheet type recording medium.

10. A floating head device according to Claims 1, 2, 3 or 5, wherein the floating head device is a multi-head type device.

11. A floating head device according to claim 3 or 5 wherein the measure spring imparts the pushing force F3 at the center of the head slider.

* * * * *